United States Patent
Litwin

(10) Patent No.: US 6,926,440 B2
(45) Date of Patent: Aug. 9, 2005

(54) INFRARED TEMPERATURE SENSORS FOR SOLAR PANEL

(75) Inventor: Robert Zachary Litwin, Canoga Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/286,200

(22) Filed: Nov. 1, 2002

(65) Prior Publication Data

US 2004/0086021 A1 May 6, 2004

(51) Int. Cl.[7] ............................................. G01K 1/16
(52) U.S. Cl. ....................... 374/124; 340/584; 126/595; 250/338.1; 348/159
(58) Field of Search .................. 348/159; 374/4–7, 374/45, 57, 137, 124, 121, 120; 340/584, 870.17; 165/287; 250/332, 334, 338.1, 341.6; 126/680, 593, 595, 597

(56) References Cited

U.S. PATENT DOCUMENTS

| | | | | |
|---|---|---|---|---|
| 3,644,667 A | * | 2/1972 | Shimolsuma et al. ........ | 374/124 |
| 4,343,182 A | * | 8/1982 | Pompei ....................... | 374/124 |
| 4,384,793 A | * | 5/1983 | O'Brien ....................... | 374/120 |
| 4,485,803 A | * | 12/1984 | Wiener ........................ | 126/680 |
| 4,636,093 A | * | 1/1987 | Nagasaka et al. ............ | 374/124 |
| 4,687,344 A | * | 8/1987 | Lillquist ...................... | 374/124 |
| 4,768,158 A | * | 8/1988 | Osanai ......................... | 374/124 |
| 4,896,281 A | * | 1/1990 | Mack ........................... | 374/124 |
| 4,904,996 A | * | 2/1990 | Fernandes .................. | 340/870.07 |
| 5,133,605 A | * | 7/1992 | Nakamura .................. | 374/124 |
| 5,139,412 A | * | 8/1992 | Kychakoff et al. ........... | 250/330 |
| 5,140,416 A | * | 8/1992 | Tinkler ........................ | 250/332 |
| 5,274,236 A | * | 12/1993 | Pascale et al. ............... | 250/334 |
| 5,532,737 A | * | 7/1996 | Braun ......................... | 348/159 |
| 5,557,260 A | * | 9/1996 | Legaz et al. ................. | 348/159 |
| 5,592,151 A | * | 1/1997 | Rolih .......................... | 340/584 |
| 5,862,800 A | * | 1/1999 | Marko ......................... | 126/680 |
| 6,236,334 B1 | * | 5/2001 | Tapperson et al. ........ | 340/825.37 |
| 6,837,616 B2 | * | 1/2005 | Ignatowicz .................. | 374/124 |
| 2002/0138847 A1 | * | 9/2002 | Abrams et al. .............. | 348/148 |
| 2004/0071186 A1 | * | 4/2004 | Ignatowicz .................. | 374/121 |

OTHER PUBLICATIONS

Cohen Gilbert E.; Kearney, David W.; Kolb, Gregory J., "Final Report on the Operation and Maintenance Improvement Program for Concentrating Solar Power Plants," Rep. No. SAND99–1290 (www.osti.gov), Sandia National Laboratories, Chap. IV(pp. 34–58), Jun. 1999.*

Cohen Gilbert E. et al. "Final Report on the Operation and Maintenance Improvement Program for Concentrating Solar Power Plants," Report No. SAND99–1290 (download from www.osti.gov), Sandia National Laboratories, Apps. L and M (pp. 103–110), Jun. 1, 1999.*

* cited by examiner

Primary Examiner—Gail Verbitsky
Assistant Examiner—Stanley J. Pruchnic, Jr.
(74) Attorney, Agent, or Firm—Harness Dickey & Pierce P.L.C.

(57) ABSTRACT

A solar receiver system for utilizing solar energy to produce electrical power and to generate a temperature profile of a plurality of receiver tubes utilized in the system. The solar receiver system includes a solar receiver having a plurality of receiver panels including the plurality of receiver tubes through which a coolant flows. Additionally, the solar receiver system includes a plurality of IR cameras adapted to view at least a portion of a surface area of the solar receiver. Each IR camera is adapted to have a field of view including a different specified region of the surface area of the solar receiver. Furthermore, the solar receiver system includes a master control system adapted to receive an IR image from each IR camera, wherein each IR image depicts surface area temperatures and variances over the region of the solar receiver viewed by each IR camera. The master control system generates a temperature profile of the surface area of the solar receiver utilizing the IR images.

18 Claims, 4 Drawing Sheets

INFRARED TEMPERATURE SENSORS FOR SOLAR PANEL

FIELD OF INVENTION

The invention relates generally to monitoring the temperature of a solar panel. More specifically, the invention relates to a system for obtaining a continuous temperature profile of a plurality of receiver tubes as a heat transfer fluid flows through the tubes. The receiver tubes are included in a plurality of solar panels that comprise a solar receiver power tower. The system utilizes a plurality of (IR) cameras to measure and record temperature values and variances over an entire surface area of the solar receiver, thereby yielding the continuous temperature profile of the outside surface of receiver tubes.

BACKGROUND OF THE INVENTION

A solar power tower is a power plant that converts solar thermal energy into electrical energy for connection to a utility grid. It can be sized to produce a wide range of power for commercial use from about 1 MWe to about 200 MWe.

The sun's thermal energy is intercepted by a collector system that is comprised of thousands of sun tracking mirrors called heliostats. This energy is redirected and concentrated on a heat exchanger, called a solar receiver, typically mounted on a tall tower. The receiver includes a plurality of solar receiver panels positioned around an outside wall of the receiver. Each solar receiver panel includes a plurality of receiver tubes through which a heat transfer fluid, or coolant, flows. Typically, the coolant is molten salt, but the coolant can be any other suitable heat transfer fluid, for example a liquid metal such as sodium (Na) or a mixture of sodium (Na) and potassium (K), water or steam. The coolant is heated by the redirected solar energy as it flows up through the receiver tubes of one receiver panel and down through the receiver tubes of the next receiver panel until it has been circulated through all the solar receiver panels, at which point the coolant exits to the hot thermal storage tank. The heated coolant is stored in the hot tank until it is pumped to a steam generator where the heat from the coolant is used to generate steam which drives a turbine/generator device to create electricity.

To avoid damage to the receiver tubes, monitoring the coolant temperature in the receiver tubes is critical to the operation of the solar receiver. Typically, a plurality of thermocouples are sporadically tack welded to the back side of various receiver tubes and receiver panel headers throughout the solar receiver. The thermocouples transmit discrete signals to a system processor such that the temperature at specific locations on various receiver tubes can be monitored. To obtain comprehensive temperature data for the entire length of every receiver tube would require a multiplicity of thermocouples tack welded to each receiver tube. This would be very labor intensive and costly. Additionally, over time, due to the expansion and contraction of the receiver tubes, caused by the heating and cooling of each tube, the thermocouples and the leads connecting the thermocouples to the system processor would be susceptible to damage. Replacing broken or damaged thermocouples or thermocouple leads would also be very labor intensive and costly.

Furthermore, having thermocouples sporadically placed throughout each receiver panel allows the potential for damage to the receiver tubes. When the thermocouples are sporadically placed throughout the receiver panel, some receiver tubes may have thermocouples attached while an adjacent tube may not. Thus, the coolant temperature in the tube without the thermocouple is only assumed to be approximately the same as the temperature of the coolant in the adjacent tube that has a thermocouple attached thereto. If there is flow blockage in a tube without the thermocouple there will be no temperature indication of the blockage. Thus, the tube may overheat and rupture causing time consuming and expensive repairs.

At night, or anytime sun light is not available, some coolants such as molten salt and liquid metals must be drained from the receiver to a cold thermal storage tank to avoid the coolant from freezing in the receiver tubes, which could cause damage to the tubes. Thus, when the sun light becomes available, the coolant must be pumped from the cold thermal storage tank to the receiver. To avoid thermally shocking the receiver tubes, which can cause damage to the tubes, the entire solar receiver must be preheated. Infrared (IR) cameras have been used to determine when the entire solar receiver has been preheated to the proper temperature. Known applications of IR cameras typically utilize 1 IR camera for gross evaluation of part of the surface temperature of the solar receiver. Prior to filling the solar receiver, one or more regions of the solar receiver would be evaluated using the IR camera to determine whether the temperature of the solar receiver is uniform and at a suitable temperature. Known solar power tower systems have utilized a single IR camera for the limited purpose of gross evaluation of a portion of the surface temperature of the solar receiver prior to filling the solar receiver. Subsequent to filling the solar receiver, evaluation of the temperature of the coolant flowing through the receiver tubes of each solar panel is typically evaluated using the sporadically placed thermocouples.

Therefore, it would be highly desirable to be able to obtain comprehensive temperature data for the entire length of each receiver tube of each receiver panel in the solar receiver. Additionally, it would be desirable to do so without using thermocouples, thereby reducing the labor and cost associated with the use of thermocouples as described above.

BRIEF SUMMARY OF THE INVENTION

In one preferred embodiment of the present invention, a solar receiver system is provided for utilizing solar energy to produce electrical power and to generate a temperature profile of a plurality of receiver tubes utilized in the system. The solar receiver system includes a solar receiver having a plurality of receiver panels. Each receiver panel includes the plurality of receiver tubes through which the coolant flows. Additionally, the solar receiver system includes a plurality of IR cameras adapted to view at least a portion of a surface area of the solar receiver. Each IR camera is located having a specified spatial relationship with the solar receiver and is adapted to have a field of view including a different specified region of the surface area of the solar receiver. Furthermore, the solar receiver system includes a master control system adapted to receive an IR color image from each IR camera, wherein each IR image depicts surface area temperatures and variances of the region of the solar receiver viewed by each IR camera. The master control system translates the IR images into digital temperature data comprising discrete temperature values at a plurality of points equally spaced along a length of each of the receiver tubes. Additionally, the master control system generates a temperature profile of the surface area of the solar receiver utilizing the digital temperature data. The surface area temperature profile is representative of a temperature profile of an outside surface of the receiver tubes.

In another preferred embodiment of the present invention, a method is provided for producing a temperature profile of at least a portion of a surface area of a solar receiver. The solar receiver includes a plurality of receiver panels having a plurality of receiver tubes through which coolant flows. The method includes positioning a plurality of infrared (IR) cameras around the solar receiver for viewing at least a portion of the surface area of the solar receiver. Each IR camera is positioned such that it has a specified spatial relationship with the solar receiver and a field of view including a different specified region of the solar receiver surface area. The method additionally includes transmitting IR color images of surface area temperatures and variances of the region of the solar receiver viewed by each IR camera from each IR camera to a master control system. Furthermore, the method includes generating a digital temperature profile of the surface area of the solar receiver utilizing the master control system. The surface area temperature profile is representative of a temperature profile of the outside surface of the receiver tubes.

BRIEF DESCRIPTION OF THE DRAWINGS

The present invention will become more fully understood from the detailed description and accompanying drawings, wherein.

DETAILED DESCRIPTION OF THE INVENTION

Figure 1:
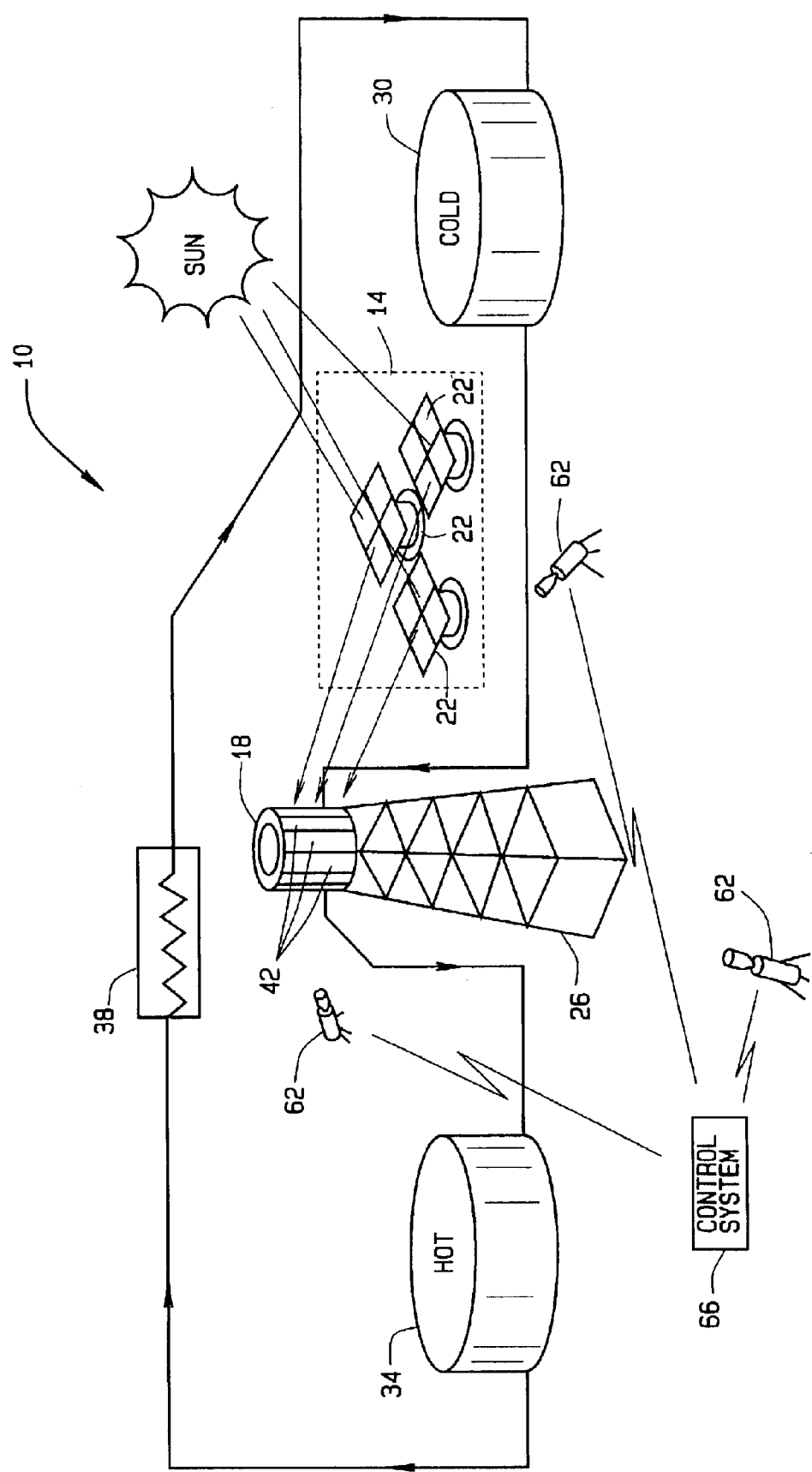
FIG. 1 is a schematic of a solar receiver system in accordance with a preferred embodiment of the present invention.

FIG. 1 is a simplified schematic representation of a solar receiver system 10 in accordance with a preferred embodiment of the present invention. Solar receiver system 10 includes a collector system 14 that intercepts the sun's thermal energy and redirects the thermal energy to a heat exchanger called a solar receiver 18. Collector system 14 includes a plurality of sun tracking mirrors called heliostats 22. Collector system 14 could include up to one thousand or more heliostats 22 depending on the overall size of system 10. Thermal, or solar, energy from the sun is redirected to the solar receiver 18 by heliostats 22. In a preferred embodiment, solar receiver 18 is mounted on a tall tower 26 typically 150 feet to 250 feet (45.7 meters to 76.2 meters) or more in height. Alternatively, solar receiver 18 can be mounted to a ground level platform or mounted below ground level in a recess. Coolant at about 550° F. is pumped out of a cold thermal storage tank 30 to the solar receiver 18. The coolant flows through solar receiver 18 where it picks up concentrated solar energy and is heated to about 1050° F. Exiting solar receiver 18, the heated coolant flows into a hot thermal storage tank 34. The heated coolant is stored in hot thermal storage tank 34 until it is needed to generate electricity. When needed to generate energy, the hot coolant is pumped out of hot thermal storage tank 34 and through a steam generator 38 where the coolant surrenders heat to produce steam before flowing into cold thermal storage 30 tank at about 550° F. The steam is allowed to expand and drive a generator (not shown) to create electricity.

Figure 2:
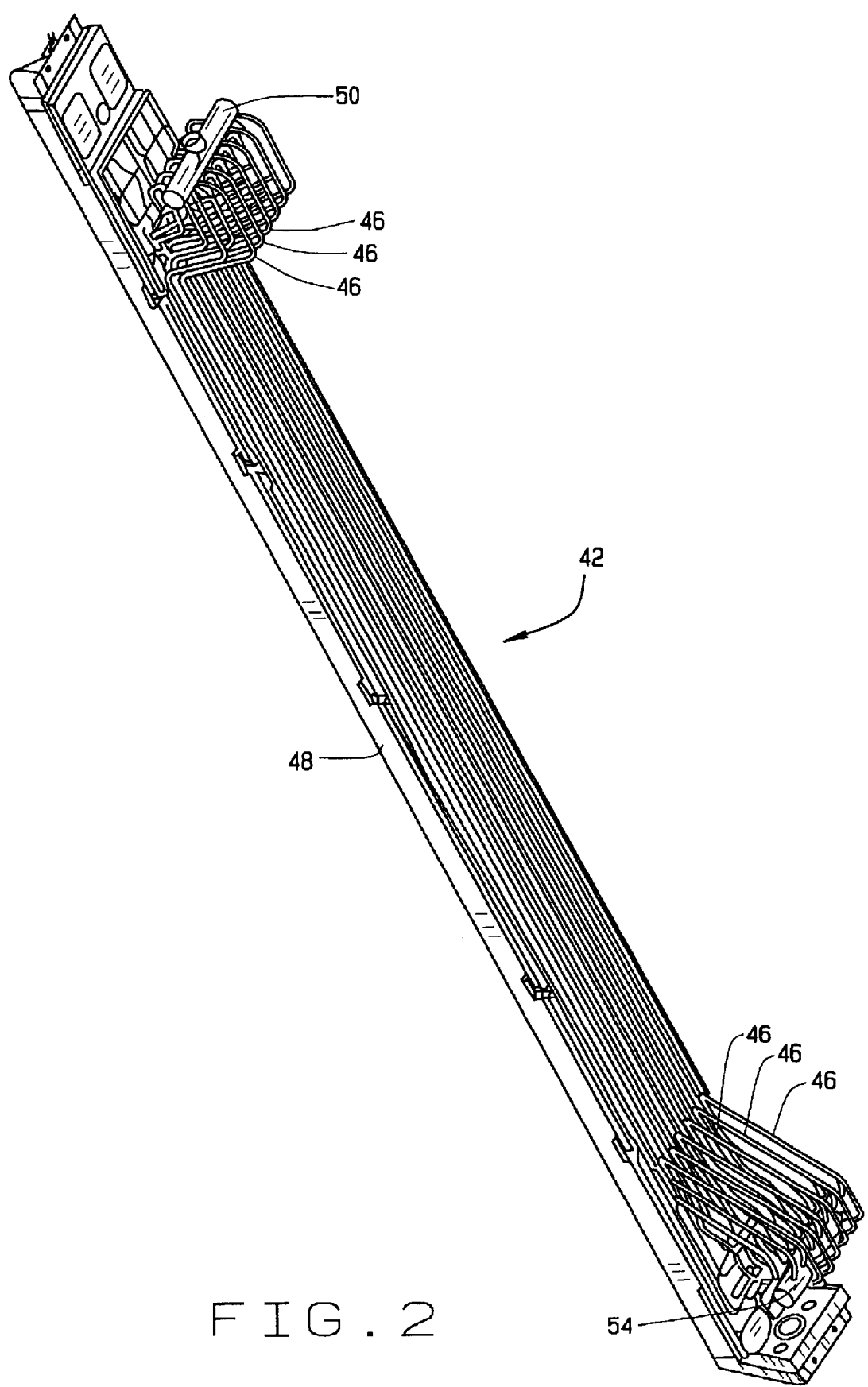
FIG. 2 is a schematic of a solar receiver panel utilized in the collector system shown in FIG. 1.

FIG. 2 is a schematic of a solar receiver panel 42 utilized in collector system 14, shown in FIG. 1. Solar receiver 18, shown in FIG. 1, includes a plurality of solar receiver panels 42 positioned circumferentially around an outside wall of solar receiver 18. Therefore, the surface area of solar receiver 18 consists of the cumulative area of the outward facing surfaces of receiver panels 42. Each solar receiver panel 42 includes a plurality of receiver tubes 46 and a top header 50 on the top of receiver panel 42. The top header 50 is connected to a bottom header 54 on the bottom of receiver panel 42 by receiver tubes 46. A strong back, or box beam structure, 48 provides rigidity to each receiver panel 42, and insulation (not shown) is provided between the strong back 48 and the receiver tubes 46.

Referring to FIGS. 1 and 2, the coolant is pumped into either top header 50 or bottom header 54 of a first receiver panel 42, then flows through receiver tubes 46 to either bottom or top header 54 or 50, respectively. The coolant is then pumped through a jumper pipe (not shown) to the appropriate corresponding header 54 or 50 of an adjacent solar receiver panel 42 (not shown), where it flows through the receiver tubes 46 of that receiver panel 42 in the opposite direction of the previous receiver panel 42. The coolant then continues to a subsequent receiver panel 42 (not shown), through which it flows again in the opposite direction. Thus, the coolant is pumped through all the solar receiver panels 42 in a serpentine manner. That is, the coolant flows up through the receiver tubes 46 of one receiver panel 42 and down through the receiver tubes 46 of the next receiver panel 42 until it has been circulated through all the solar receiver panels 42, at which point the coolant enters the hot thermal storage tank 34.

The use of hot and cold thermal storage tanks 34 and 30 respectively, allows the production of electric power not necessarily concurrent with sunshine. Electric power production can be shifted to later hours or even provided twenty-four hours a day, if desired.

With reference again to FIG. 1, in order to monitor the temperature of receiver tubes 46 as coolant flows through the receiver panels 42, system 10 includes a plurality of infrared (IR) cameras 62 that communicate with a master control system 66. In a preferred embodiment, IR cameras and master control system 66 communicate using wireless signals such as radio frequency (RF) signals. Alternatively, IR cameras 62 and master control system 66 can communicate using any suitable communication medium such as a hard wired network, e.g. a LAN. Additionally, in a preferred embodiment, IR cameras 62 are permanently mounted at ground level, a specified distance from solar receiver 18 in the heliostat field. The specified distance is suitable to allow each IR camera 62 to be oriented such that it has an unobstructed view of at least a portion of the surface area of solar receiver 18. Preferably, each IR camera 62 is mounted and oriented to view the entire length of the outward facing surfaces of a plurality of receiver panels 42, which comprise a predetermined region of the overall surface area of solar receiver 18. Alternatively, to enhance the field of view of each IR camera 62, IR cameras 62 can be mounted above the ground surface on a pole or other support structure, or below the ground surface in a recess.

Thus, each IR camera 62 is located and oriented to have a specified spatial relationship with solar receiver 18, where each IR camera has a field of view that includes at least a portion of the surface area of solar receiver 18. Furthermore, in a preferred embodiment, IR cameras 62 are fixedly mounted, oriented, and configured such that the field of view for each IR camera 62 can only be adjusted by manual manipulation. Alternatively, each IR camera 62 is mounted, oriented, and configured such that the field of view for each IR camera 62 can be adjusted remotely, for example via signals from master control system 66. Adjustment of the field of view can include 'Zooming In/Out' and viewing other aspects of system 10 such as solar receiver tower 26 or a heat shield (not shown) connected to solar receiver 18.

Figure 3:
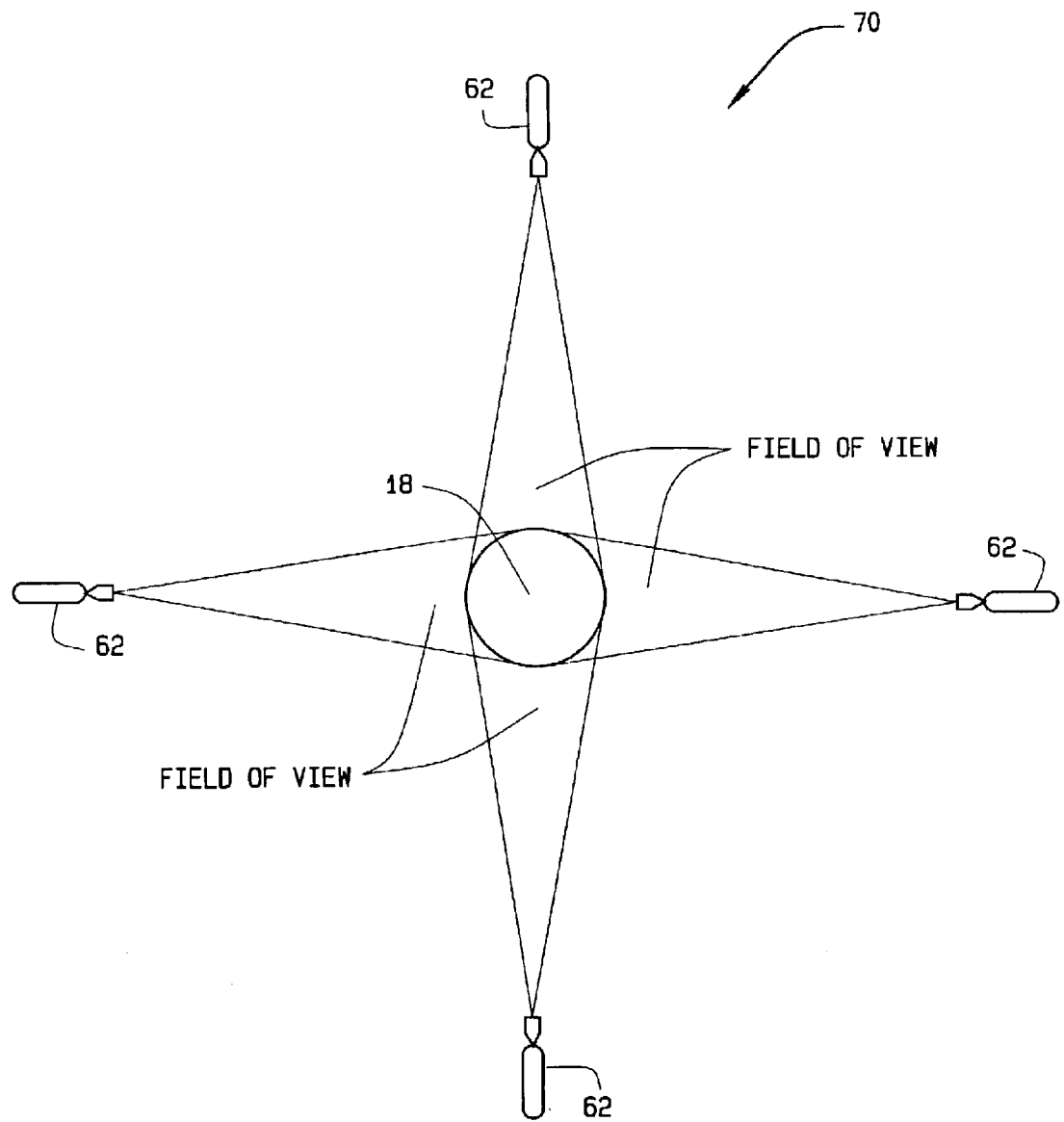
FIG. 3 is a diagram illustrating an exemplary arrangement of the IR cameras, shown in FIG. 1, with respect to the solar receiver, shown in FIG. 1, in accordance with a preferred embodiment of the present invention.

FIG. 3 is a diagram 70 illustrating an exemplary arrangement of IR cameras 62 with respect to solar receiver 18, in accordance with a preferred embodiment of the present invention. In a preferred embodiment, solar receiver system 10 (shown in FIG. 1) includes two or more, and ideally three or more, IR cameras 62. FIG. 3 illustrates an arrangement where solar receiver system 10 includes four IR cameras 62 such that each of the four IR cameras 62 has a field of view including approximately one half of the surface area of solar receiver 18. With all four IR cameras 62 having a field of view of approximately half the surface area of solar receiver 18, there is overlap between the fields of view. In one preferred embodiment this overlap is electronically eliminated. In an alternate preferred embodiment the overlap allows for additional data to be collected from the regions of the surface area that have a more acute viewing angle and are subject to less resolution by IR cameras 62. Therefore, the overlap areas of the four fields of view provide additional temperature data for those regions of the surface area.

In another alternate preferred embodiment, each of the IR cameras is adjusted to have a field of view including less than half of the surface area of solar receiver 18. For example, four IR cameras 62 could be positioned and adjusted such that each views one fourth of the surface area, or three IR cameras 62 could be positioned and adjusted such that each views one third of the surface area. It should be noted that the greater the number of IR cameras 62 utilized the greater the resolution will be for each receiver tube 46 viewed by each IR camera 62.

Figure 4:
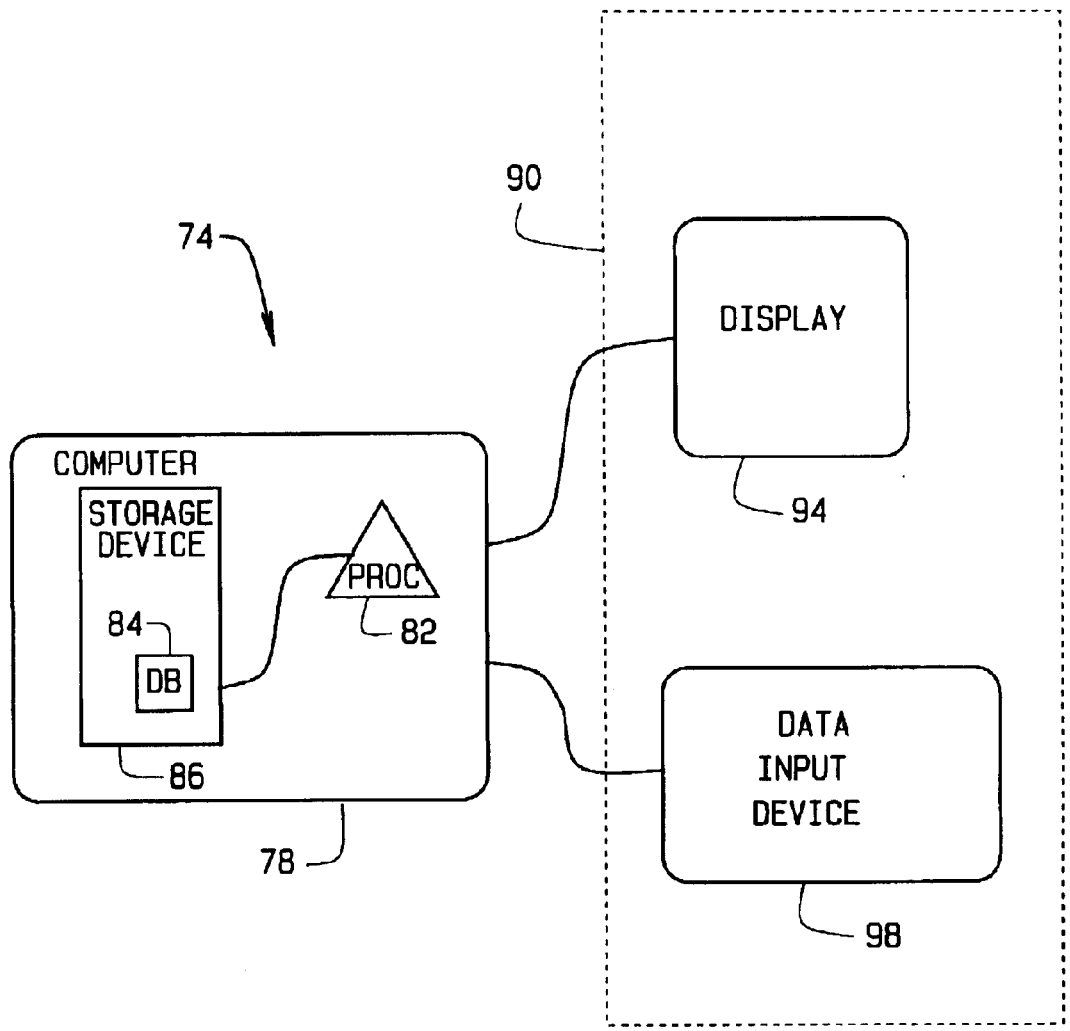
FIG. 4, is a schematic of a computer system included in the control system shown in FIG. 1, in accordance with a preferred embodiment of the present invention.

FIG. 4, is a schematic of computer system 74 included in control system 66 (shown in FIG. 1), in accordance with a preferred embodiment of the present invention. Computer system 74 includes a computer 78, that includes a processor 82 suitable to execute all functions of computer 78, a database 84, and an electronic storage device 86. Storage device 86 may comprise a computer readable medium, such as a hard disk drive or magnetic tape device, for storing software programs, algorithms, information and other data. Database 84 is used for storing information and data specific to the temperature and temperature variances over the surface area of solar receiver 18, as transmitted to control system 66 by IR cameras 62. For example, database 84 may store algorithms, software packages, and reference tables.

Additionally, computer system 74 includes a processor-user interface 90. Processor-user interface 90 is connected to computer 78 and includes a display 94 for viewing such things as information, data, and graphical representations. Additionally, processor-user interface 90 includes a data input device 98 that allows a user to input information, data, and queries to computer 78. For example, data input device 98 can be a keyboard, touch screen, or a mouse. Alternatively, computer 78 can be any suitable computing device capable of storing data and executing software programs.

Referring to FIG. 1, during operation of system 10, IR cameras 62 transmit IR images to control system 66. The IR images depict surface area temperatures and temperature variances over the portion, or region, of the solar receiver 18 surface included in the field of view of each respective IR camera 62. Preferably, RF signals are used to transmit the IR images, but any suitable means of transmitting the IR images is within the scope of the invention. Master control system 66 then utilizes computer system 74 (shown in FIG. 4) to translate the IR images into digital temperature data. The resolution of IR cameras 62 is such that the IR images transmitted from each IR camera 62 are translated into digital temperature data that defines the temperature values at a plurality of points equally spaced along a length of each receiver tube 46 included in the field of view of each IR camera 62. For example, the digital temperature data could define temperature values every inch (25.4 mm), every four inches (101.6 mm), every foot (30.48 cm), or every yard (0.91 m) along the length of each receiver tube 46.

Cumulatively, the IR images from all the IR cameras 62 are translated by computer system 74 to digital temperature data defining the temperature values along the length of each receiver tube 46 included in each receiver panel 42 of solar receiver 18. Computer system 74 utilizes the digital temperature data to generate a temperature profile of discrete temperature readings for at least a portion of the solar receiver 18 surface area, and more preferably for the entire surface area. The temperature profile depicts the temperature values and variances over at least a portion of the solar receiver 18 surface area. The temperature profile of the surface area is interpreted to represent a temperature profile of the outside surface of the receiver tubes as coolant flows through solar receiver 18. Additionally, system 10 can be utilized to generate a temperature profile of the outside surface temperatures of receiver tubes 46 during a preheat phase when coolant is not flowing through receiver tubes 46. Furthermore, system 10 can be utilized to monitor temperatures of other components of system 10, for example solar receiver tower 26 or solar receiver heat shields (not shown).

Computer system 74 generates, on display 94 (shown in FIG. 4), a graphical representation of the temperature profile. The graphical representation is viewable by a user and utilized to evaluate the functional status of at least a portion of solar receiver 18 and the receiver tubes 46 included in that portion. In one preferred embodiment, the temperature profile graphically displayed is used to evaluate the functional status of all the receiver tubes 46 included in all the receiver panels 42 of solar receiver 18. The graphical representation is displayed in any suitable format for presenting the temperature profile to the user. For example, the graphical representation can present the temperature profile as a two-dimensional or three-dimensional graphical image, a matrix table containing the discrete temperature values, or a chart comprising plotted temperature values.

Additionally, in one preferred embodiment, master control system 66 is accessible via the Internet, an intranet, or any other form of wide area or local area network, such that the temperature profile and other data and operations are accessible and controllable from a remote location. For example, a user at a remote site can access master control system 66 via the wide area network, view the temperature profile in a matrix format, send a command to change the graphical representation of the temperature profile to a three-dimensional graphic format, and adjust the field of view for any of the IR cameras 62. Furthermore, master control system can include a printer (not shown) such that the temperature profile can be printed on any suitable tangible medium.

Using IR cameras 62 and master control system 66 to view the surface area of solar receiver 18, translate the images into digital discrete temperature values for a plurality of points along the length of receiver tubes 46, and generate a temperature profile based on the discrete temperature values allows a user to more effectively evaluate the temperature of each receiver tube 46. This provides qualitative information and data useable to evaluate the operational status of the solar receiver 18 without the costs and other problems associated with using thermocouples to produce such comprehensive quantitative data and information. Additionally, in one preferred embodiment, control system 66 is adapted to generate an alarm signal that indicates the temperature of one or more receiver tubes 46 is outside a specified temperature range. The alarm would prompt an operator to take corrective action to prevent over-stressing receiver tubes 46 due to undesirable thermal conditions.

While the invention has been described in terms of various specific embodiments, those skilled in the art will recognize that the invention can be practiced with modification within the spirit and scope of the claims.

What is claimed is:

1. A system for generating a temperature profile of at least a portion of a surface area of a solar receiver having a plurality of receiver panels, said system comprising:
   a plurality of IR cameras positioned to view approximately one half of the surface area of said solar receiver, wherein each said IR camera is located to have a field of view including a different one half of the surface area of said solar receiver such that said field of view for each IR camera includes a portion of overlap with said field of view of at least one of said other IR cameras; and
   a control system adapted to:
      receive information relating to an IR image from each said IR camera, each said IR image depicting IR readings at a plurality of equally spaced points across the entire related one half of the surface area of said solar receiver viewed by each said IR camera;
      translate said plurality of IR readings into digital temperature data comprising discrete digital temperature values at a plurality of points equally spaced along a length of each one of a plurality of receiver tubes included in each of the receiver panels, the digital temperature values representative of temperature values of an outside surface of the receiver tubes, wherein said overlap portions provide additional digital temperature data for said equally spaced points within said overlap portions;
      generate a digital temperature profile of at least approximately one half of the surface area of said solar receiver utilizing said digital temperature data, wherein said additional digital temperature data received from said overlap portions provides added accuracy of said digital temperature profile at said overlap portions; and
      generate an alarm signal when the temperature at any of said equally spaced points exceeds a predetermined threshold value.

2. The system of claim 1, wherein said control system is further adapted to utilize said discrete digital temperature values to generate said digital temperature profile and generate a graphical representation of said digital temperature profile.

3. The system of claim 2, wherein said graphical representation comprises at least one of:
   a graphical image graphically depicting temperature values and variances over at least a portion of the solar receiver surface area;
   a matrix table comprising numerical data representing the temperature values and variances over at least a portion of the solar receiver surface area; and
   a chart comprising plotted values representing the temperature values and variances over at least a portion of the solar receiver surface area.

4. The system of claim 1, wherein the field of view of each said IR camera is manually adjustable.

5. The system of claim 1, wherein the field of view of each said IR camera is remotely adjustable.

6. The system of claim 1, wherein said control system is accessible via a network such that said digital temperature profile is accessible from a remote location.

7. A method for generating a temperature profile of at least a portion of a surface area of a solar receiver including a plurality of receiver panels, said method comprising:
   positioning a plurality of infrared (IR) cameras around the solar receiver, wherein each IR camera is for viewing approximately one half of the surface area of the solar receiver, each IR camera being positioned to view a different one half of the solar receiver surface area such that the field of view for each IR camera includes a portion of overlap with the field of view of at least one of the other IR cameras;
   transmitting, from each IR camera to a control system, IR images depicting IR readings at a plurality of equally spaced points across the entire related one half of the surface area of the solar receiver viewed by each IR camera;
   translating the plurality of IR readings into digital temperature data comprising discrete digital temperature values at a plurality of points equally spaced along a length of each of a plurality of receiver tubes included in each receiver panel, wherein the overlap portions provide additional digital temperature data for the equally spaced points within the overlap portions;
   generating a digital temperature profile of at least approximately one half of the surface area of the solar receiver utilizing the digital temperature data, wherein the additional digital temperature data received from the overlap portions provides added accuracy of the digital temperature profile at the overlap portions; and
   generating an alarm signal when the temperature at any of the equally spaced points exceeds a predetermined threshold value.

8. The method of claim 7, wherein generating a digital temperature profile further comprises:
   utilizing the control system to generate the digital temperature profile using the discrete digital temperature values; and
   generating a graphical representation of the digital temperature profile utilizing the control system.

9. The method of claim 8, wherein generating a graphical representation comprises generating at least one of the following:
   a) a graphical image graphically depicting temperature values and variances over at least a portion of the solar receiver surface area;
   b) a matrix table comprising numerical data representing the temperature values and variances over at least a portion of the solar receiver surface area; and
   c) a chart comprising plotted values representing the temperature values and variances over at least a portion of the solar receiver surface area.

10. The method of claim 7, wherein the method further comprises accessing the control system from a remote location via a network.

11. The method of claim 7, wherein positioning a plurality of IR cameras comprises adapting each IR camera such that the field of view is manually adjustable.

12. The method of claim 7, wherein positioning a plurality of IR cameras comprises adapting each IR camera such that the field of view is remotely adjustable.

13. A solar receiver system for utilizing solar energy to produce electrical power, said system adapted to generate a temperature profile of an outside surface of a plurality of receiver tubes utilized in said system, said solar receiver system comprising;

a solar receiver comprising a plurality of receiver panels, each said receiver panel comprising a plurality of receiver tubes through which a coolant flows;

a plurality of IR cameras, wherein each IR camera is adapted to view approximately one half of a surface area of said solar receiver, wherein each said IR camera is located to have a field of view including a different one half of the surface area of said solar receiver such that said field of view for each IR camera includes a portion of overlap with said field of view of at least one of said other IR cameras; and a control system adapted to:
receive an IR image from each said IR camera, each said IR image depicting IR readings at a plurality of equally spaced points along a length of each said receiver tube within the related one half of the surface area of the solar receiver viewed by each said IR camera;
translate said plurality of IR readings into digital temperature data comprising discrete digital temperature values at each of the equally spaced points, the temperature values representative of temperature values of the outside surface at each point of said receiver tubes, wherein the overlap portions provide additional digital temperature data for the equally spaced points within the overlap portions; and
generate a digital temperature profile of at least approximately one half of the surface area of said solar receiver utilizing said digital temperature data, wherein the additional digital temperature data received from the overlap portions provides added accuracy of the digital temperature profile at the overlap portions; and
generate an alarm signal when the temperature at any of the equally spaced points exceeds a predetermined threshold value.

14. The system of claim 13, wherein said control system is further adapted to utilize said discrete digital temperature values to generate said surface area digital temperature profile and generate a graphical representation of said surface area temperature profile.

15. The system of claim 14, wherein said graphical representation comprises at least one of:
a graphical image depicting temperature values and variances over at least a portion of the solar receiver surface area;
a matrix table comprising numerical data representing the temperature values and variances over at least a portion of the solar receiver surface area; and
a chart comprising plotted values representing the temperature values and variances over at least a portion of the solar receiver surface area.

16. The system of claim 13, wherein the field of view of each said IR camera is manually adjustable.

17. The system of claim 13, wherein the field of view of each said IR camera is remotely adjustable.

18. The system of claim 13, wherein said control system is accessible via a network such that said temperature profile is accessible from a remote location.

* * * * *